United States Patent [19]

Eastman et al.

[11] Patent Number: 4,603,262
[45] Date of Patent: Jul. 29, 1986

[54] OPTICAL DEVICE FOR DETECTING CODED SYMBOLS

[75] Inventors: Jay M. Eastman, Pittsford; John A. Boles, Rochester, both of N.Y.

[73] Assignee: Optel Systems Inc., Rochester, N.Y.

[21] Appl. No.: 525,077

[22] Filed: Aug. 22, 1983

[51] Int. Cl.⁴ .............................................. G06K 7/10
[52] U.S. Cl. ..................................... 250/566; 235/472
[58] Field of Search ............... 235/472, 462, 468, 454; 382/59; 250/341, 333, 334, 566; 128/396, 395; 219/121 LA, 121 LX; 369/122

[56] References Cited

U.S. PATENT DOCUMENTS

| | | | |
|---|---|---|---|
| 3,902,036 | 8/1975 | Zaleckas | 219/121 LX |
| 4,151,415 | 4/1979 | Lipke | 250/333 |
| 4,298,280 | 11/1981 | Harney | 250/334 |
| 4,408,120 | 10/1983 | Hara et al. | 235/472 |
| 4,417,814 | 11/1983 | Doliber | 250/333 |
| 4,454,882 | 6/1984 | Takano | 128/395 |
| 4,460,120 | 7/1984 | Shepard et al. | 235/462 |

*Primary Examiner*—David C. Nelms
*Assistant Examiner*—L. W. Madoo
*Attorney, Agent, or Firm*—Martin LuKacher

[57] ABSTRACT

An optical device for detecting bar codes (markings or patterns which symbolize data such as the name and vendor of a product) are detected by an optical device which serves as a bar code scanner. A laser diode and associated optics provides an invisible beam. A visible marker beam coincident with the laser beam is generated by a lamp and associated optics and directed coaxial with the laser beam so as to enable the laser beam to be scanned across the bar code by moving a housing in which the laser and the lamp and their associated optics are disposed. Also contained in the housing is a photodetector on which scattered light from the code is incident after passing through a collection lens located at an outlet port for the beams. An aperture is positioned between the collection lens and the detector. The location and size of the aperture and the focal length of the lens are related such that the illumination by the reflected light of the detector is substantially constant and the output signal from the detector which represents the bar code is also constant amplitude over a wide depth of focus in front of the beam port. Unwanted reflections (gloss over the bar code) are rejected by selecting the polarization of the reflections opposite to the polarization of the laser beam, as by the use of a polarizing beam splitter. A spectral beam splitter is used near the detector to select the scattered laser light for the photodetector which generates electrical signals corresponding to the bar code.

25 Claims, 6 Drawing Figures

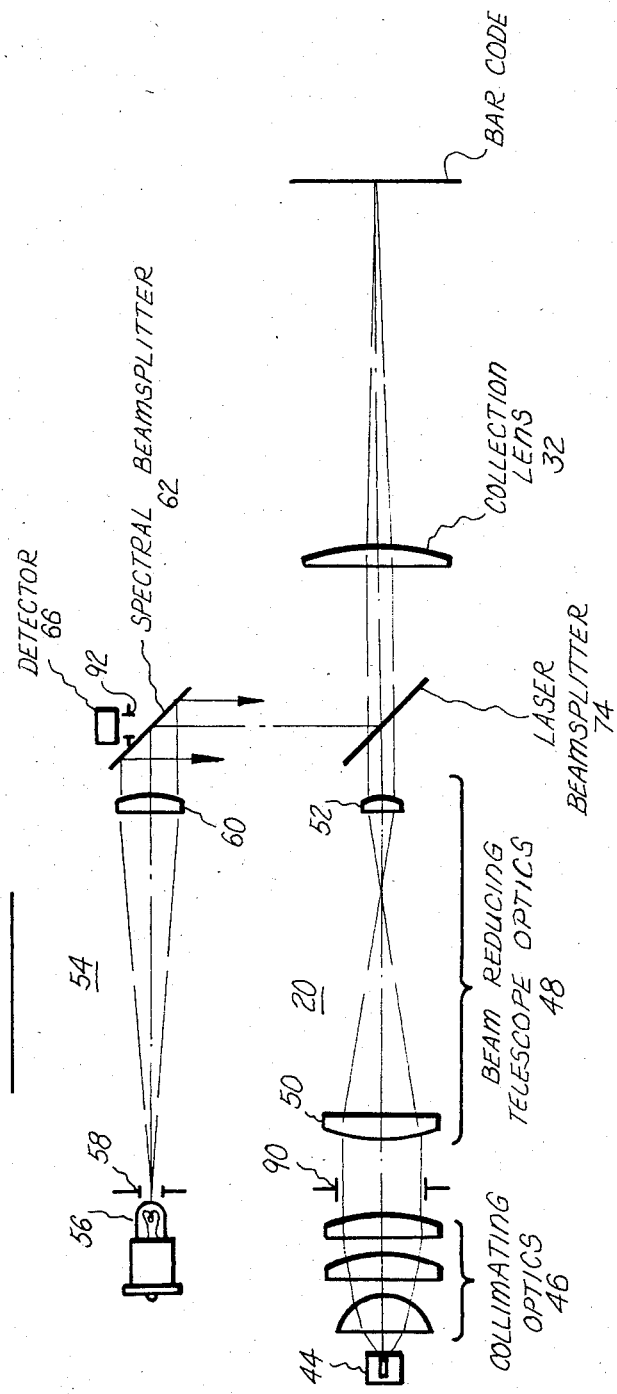

OPTICAL DEVICE FOR DETECTING CODED SYMBOLS

DESCRIPTION

The present invention relates to optical devices for detecting coded symbols, and particularly to an optical scanner for scanning bar codes and other symbols, markings and patterns which represent data; the term "bar code" being comprehensive and inclusive of all such symbols, marking and patterns.

The invention is especially suitable for use in a handheld bar code scanner which detects bar codes consisting of a series of parallel light and dark bars of different widths and of rectangular shape of the type which satisfies the uniform product code (UPC) specifications or other types of bar code specifications such as Code 39, Interleaved Two of Five, and Codabar. Features of the invention may also be useful in other types of optical devices and scanners which may not be adapted for hand-held operation, such as wherever problems of collection of reflected light and integration of optical and electronic components, may be faced.

Typical bar code scanners which are presently available utilize a gas laser, such as a helium neon (He-Ne) laser to generate a laser beam. The beam is readily visible, even in a brightly lighted environment, and enables the beam to be aimed at the bar code. In the interest of ease of operation of bar code scanners, it is desirable that they be miniaturized. To that end it becomes desirable to substitute much smaller lasers than the typically used He-Ne laser. It would be desirable to use a laser diode. However, laser diodes capable of providing the necessary intensity of illumination are typically gallium arsenide (typically gallium aluminum arsenide [GeAlAs]) laser material which lases in the infrared (typically 815 nanometers (nm)). Since a laser beam is very small in diameter, it becomes easy to miss the bar code. Thus the rate of successful readings per scan can be unacceptably small. This discourages the operator and militates against the use of diode laser based scanners even though they are adapted to miniaturization.

It is a feature of the present invention to provide an optical device for detecting coded symbols which utilizes an invisible light beam to scan the symbol while marking the path of the beam with a visible beam of light coincident with the invisible beam and without interference between the visible and invisible beams in code detection.

Bar code scanners must collect reflections from the code symbol and translate such reflections into electrical signals which can be decoded. With a handheld bar code scanner the bar code (usually on a label on a product) may be located at different distances in front of the scanner. The illumination of a photodetector and the output signal therefrom in response to the reflections is subject to variation depending upon the distance between the bar code and the scanner. It is a feature of this invention to provide for the collection of the reflections in a manner to provide constancy of illumination of the detector, and therefore minimize the variation in the amplitude of the electrical output signal therefrom.

The availability of bar code scanners at reasonable cost depends upon the successful integration of the optical, electro-optical and electronic components thereof. These must be packaged, not only for ease of assembly into a housing small enough to be hand-held, but also the optical components must be protected for shock and vibration which may be encountered not only in assembly but in the use and operation of the scanner. It is a feature of the present invention to provide a unitary assembly whereby the electronic components for operating the laser are mounted on a printed circuit board which forms the basis of the support of the laser and its optical components as well as other electro-optical components of the scanner, such as the photodetector thereof. This unitary assembly facilitates the manufacture of the scanner and provides protection against shock and vibration both in the manufacture, maintenance and use.

Accordingly, it is a principal object of the present invention to provide an improved optical device for reading bar codes.

It is another object of the present invention to provide an improved bar code scanner utilizing a laser diode as the source of illumination of the bar code.

It is a still further object of the present invention to provide an improved bar code scanner which is handheld and may be in the shape of a small gun which may be pointed at, and manually scanned across, the code.

It is a still further object of the present invention to provide an improved bar code scanner in which collection of reflections from the code is accomplished with substantially constant illumination over a large depth of field or focus in front of the scanner.

It is a still further object of the present invention to provide improved bar code scanning apparatus wherein optical, electro-optical, and electronic apparatus are integrated into a unitary structure to facilitate manufacture and improve reliability during use.

Briefly described, an optical device for detecting bar code symbols having relatively more or less reflective regions (typically bar codes) utilizes means for illuminating the bar code with a beam of substantially invisible light (preferably from a laser diode). Means are provided for simultaneously illuminating the symbol with a marker beam of light which is visible and which is coincident with the laser beam. This enables the operator to locate the laser beam with respect to the code symbols, such that the code symbols can be scanned with a high degree of assurance that the laser beam will be reflected from the code symbols. The device also has means responsive to the reflections of the laser beam from the symbols which translates the symbols into corresponding electrical signals. These electrical signals may be decoded to provide outputs representing the symbols thereby enabling the reading of the bar codes.

The foregoing and other objects features and advantages of the invention as well as a presently preferred embodiment thereof, will become more apparent from a reading of the following description in connection with the accompanying drawings in which:

FIG. 4 is a ray diagram illustrating the operation of the optical and electro-optical elements of the scanning gun shown in FIG. 1;

Figure 2:
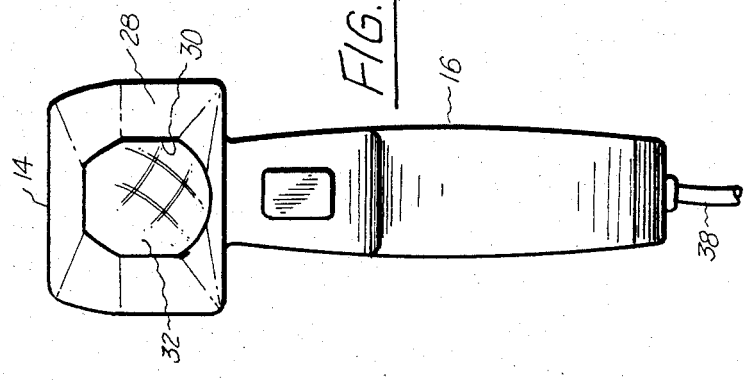
FIGS. 2 and 3 are opposite end views of the scanning gun shown in FIG. 1.
Figure 1:
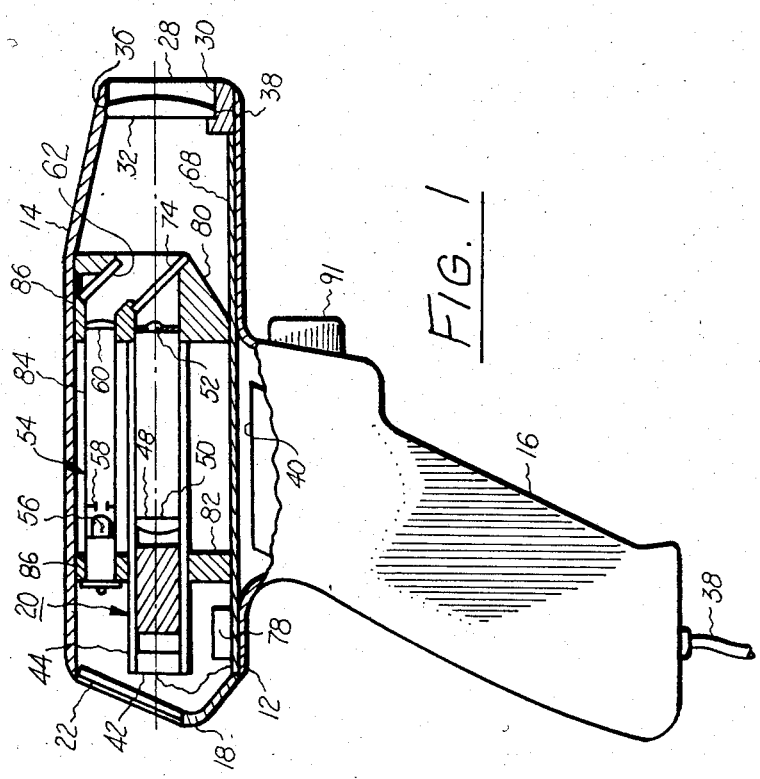
FIG. 1 is a front view, partially in section showing a bar code scanning gun embodying the invention.
Figure 3:
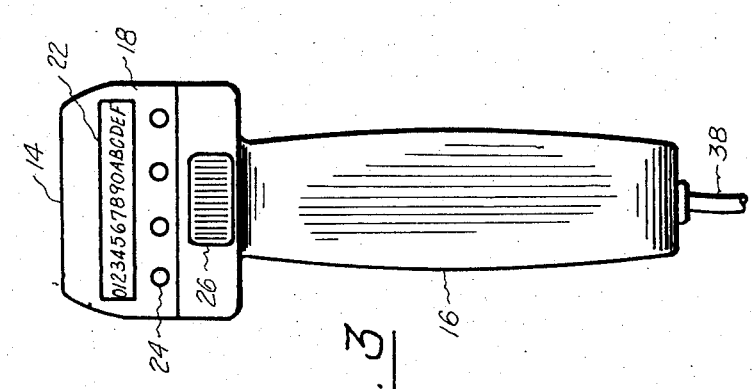

Referring more particularly to FIGS. 1, 2 and 3, there is shown a bar code scanning gun 10 with a housing 12 having an upper portion 14 and a handle portion 16. The housing may be formed of plastic material, preferably by injection molding. The housing is split into right and left halves which may initially be open for the insertion of the optical, electrooptical, and electronic assembly 20 of the scanner. A display board 22, indicator lamps 24 and a port 26 for the audible tone which is generated to signify a successful scan are located at the rear end 18. The display may suitably be a liquid crystal display and the lamps may be light emitting diodes. The light emitting diodes indicate the operating state of the scanner (whether the scanner is turned on or is off and inoperative) and may also indicate when a successful scan has been completed.

The front end 28 of the upper portion 14 of the housing 12 has an opening through which the scanning beam and the reflections from the bar code symbols pass. This opening is called the beam port 30. A collection lens 32 is mounted against shoulders 36 and 38 of the housing in the beam port 28.

The gun may be small for convenient handling. Suitably it has a length in the horizontal direction between the front and rear ends 28 and 18 of about 5 inches, a width in the vertical direction between the top of the upper housing 14 and the bottom of the handle 16 of about 5½ inches and a width across the upper housing 14 of about 1¾ inches. The code may be located over a distance of about 10 inches from the front end 28; that is the object carrying the code may be either placed directly against the front end 28 or be about 10 inches away. The depth of focus of the scanner 10 enables the detection of codes over such a long distance. Nevertheless there is a maximum distance depending upon the width of the bars which make up the code. For fine bars, for example 0.0075 inches in width, the maximum depth of field may be 3 inches. The maximum depth of field for wide bars (0.040 inches in width) may be 10 inches. The maximum depth of field for 0.01 inch width bars may be 4 inches; and for 0.02 inch width bars, 6 inches. The code symbols are scanned with a twist of the operators wrist. The beam is then scanned across the code and reflections derived from the bars which are translated into electrical signals. The signals, suitably amplified may be obtained from the scanner by means of a cable 38 which may be used to convey the signals to decoding electronics. The cables may also carry the power for operating the scanner. Alternatively batteries for operating the scanner may be housed in the handle 16. Also decoding electronics may be located on a board 40 in the handle.

A laser beam of coherent light is produced by a laser diode 42 mounted at one end of a barrel 44. Optics 46 collimates the diverging fan beam from the laser diode. These optics may be of the type typically used in microscope objectives or in digital audio disk systems. If a microscope objective is used, the objective is reversed in that the end nearest the diode is the end that would face the specimen in the typical microscope application. Telescope optics 48 provided by two lenses 50 and 52 of longer and shorter focal length, respectively, reduces the beam from the collimating optics 46. The reduced size beam is focused by the collection lens 32 to a point in front of the beam port 28. The depth of field or focus of the optical system, of course, allows for the reading of the codes over the entire distance, as mentioned above.

The laser diode produces coherent light in the infrared (typically 815 nm). The diode 42 is contained in an assembly with a photodetector which operates with power control circuitry so as to maintain the intensity of the output beam substantially constant. A suitable laser diode may be procured from Mitsubishi Electric, Semiconductor Division, Mitsubishi Electronics America, Inc., Sunnyvale, Calif. 94068. The power control and other circuitry used with the laser diode is described in specifications published by Mitsubishi Electric.

Inasmuch as the laser beam is substantially invisible there is provided means for illuminating the code with a marker beam of visible light. These marker beam illuminating means 54 are provided by a lamp 56 which may be a miniature high-intensity incandescent lamp. A light emitting diode may alternatively be used. Optics associated with the lamp 56 in the marker beam illuminating means 54 focuses the marker beam on the code in front of the beam opening. These optics include an aperture 58, a lens 60, a spectral beam splitter 62, a laser beam splitter 74 and the collection lens 32. The spectral beam splitter 62 may have a thin film coating which reflects the visible marker beam downwardly to the laser beam splitter 74. The marker beam is then coaxially coincident with the laser beam as both beams pass through the collection lens 32 and the beam port 30. The laser beam, of course, passes directly through the laser beam splitter 74.

A photodetector 66 (suitably a photo-diode or phototransistor) is disposed offset from the beam path for the detection of reflections from the code symbols which enter the beam port and are focused by the collection lens 32 on the detector 66. The detector is preferably disposed on the top of the upper housing 14 for protection against ambient light from overhead sources of illumination (usually fluorescent lamps). The detector may, however, be located on the bottom of the upper housing 14. Then another beam splitter may be required to serve the purpose of the spectral beam splitter 62 in reflecting the reflected laser beam onto the detector.

Inasmuch as the polarization of the reflections due to glossy finishes on the bar code symbols will be specular, the reflected light which is specularly reflected has the same polarization as the incident laser beam (for example, p linear polarization). The scattered light from bar codes will contain half p polarized light and half s polarized light. The laser beam splitter reflects only the s polarized light which comes only from the bar code symbols. This s polarized light is then transmitted through the spectral beam splitter 62 to the detector 66. Noise in the output signal from the detector which would be due to the gloss and other specular reflection is therefore substantially eliminated. Instead of a polarizing beam splitter 74, a conventional beam splitter may be used and polarizing material which passes only s polarization may be located ahead of the detector 66.

The laser diode 42 is oriented so that its output beam has its major axis vertical. The beam is shaped in that it is substantially a truncated ellipse. The major axis is vertical. The beam has a divergence of approximately 13° (6.5° on opposite sides of the vertical main axis), and approximately 38° (19° on opposite sides of the horizontal axis). The first lens of the collimating optics 46 are spaced from the laser diode to collect substantially the entire beam (the full 38°) emitted from the laser diode.

The laser beam producing means 20, the marker beam producing means 54 together with the beam splitters 62 and 70, are mounted to each other and to a printed circuit board 68 which contains a tone generator 78 and other analog circuitry for operating and controlling the laser diode 42 (the power control circuitry) and energizing the lamp 56. The circuit components (resistors, capacitors, transistors and integrated circuit chips) are mounted on the printed circuit board 68 and are not shown to simplify the illustration. The board 68 is located on the bottom of the upper housing 14 which is substantially flat as is shown in FIGS. 2 and 3. The board is located by one of the mountings which supports the collection lens 32. The board is held firmly in place by clips or other means (not shown). The barrel 44 is attached to the board 68 by forward and rear brackets 80 and 82. The forward bracket 80 also holds the laser beam splitter 74. The optics 54 and the lamp 56 are mounted in a barrel 84 contained in annular front and rear brackets 86 and 88. These brackets are attached to the barrel 44. The front brackets 86 also mount the spectral beam splitter 62. The entire unitary assembly 20 may then be inserted into the upper housing portion 14 and clipped in place. The brackets may be mounted in materials such as rubber having resiliency and serve as shock absorbing mounts. The scanner gun may therefore be dropped (although this is not recommended) without the reasonable probability that the scanner active elements will be damaged.

A trigger switch 91 turns on the laser diode 42 and the marker beam lamp 56. When the switch is held in, the beams are turned on for a fixed period of time. Even if the switch is released, the beams remain on for a the full, fixed period of time. A timer circuit may be used for this purpose. While the beams are on, the operator scans the beams across the code symbols. The marker beam minimizes the probability of missing the code symbols even in a brightly lighted area. Accordingly, the code symbols will be detected with a high success rate.

The operation of the laser and marker beam illuminating means will be more apparent from FIG. 4 which contains ray diagrams and shows the lenses in greater detail. The collimating optics typically may include three plano-convex lenses, suitably having a magnifying power of approximately 20 times. An aperture or stop 90 defines the collimated beam which may suitably be 6 millimeters along the major or vertical axis. The telescope optics 48 may be made up of the lens 50 which brings the beam to a focus near the other lens 52 of the telescope optics 48. The lens 50 may suitably have a focal length of 27 mm while the lens 52 has a focal length of 4 mm. This provides a reduction in the size of the beam from 6 mm to approximately 1 mm in the vertical direction. The collection lens 32 suitably has a f number (f#) greater than 50 in the vertical or long direction for the outgoing laser beam.

The collection lens 32 and an aperture stop 92 ahead of the detector 66 provides for constant illumination and constant signal output from the detector over the entire depth of focus of the scanner ahead of the beam port 28 (FIG. 1).

Figure 6:
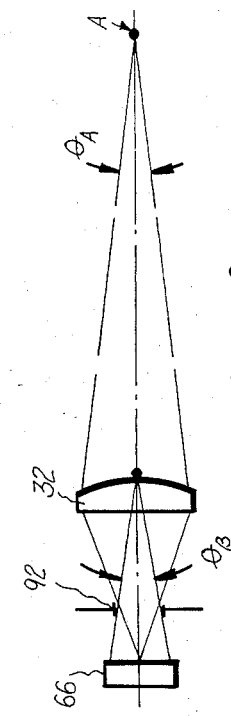
FIG. 6 is a ray diagram similar to FIG. 5 illustrating another feature of the optics shown in FIG. 5.
Figure 5:
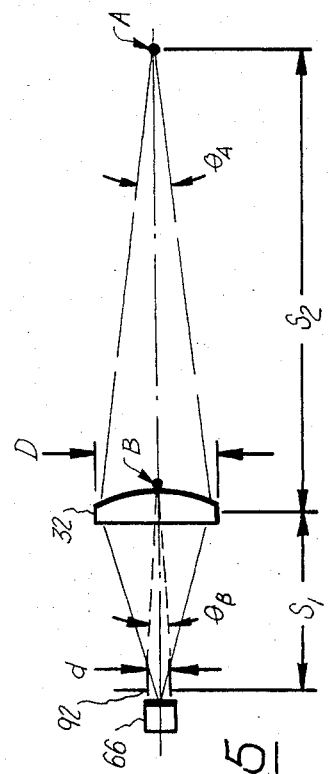
FIG. 5 is a ray diagram illustrating the operation of the optics in collection of light reflected from the bar coded symbols.

FIGS. 5 and 6 are ray diagrams which illustrate how the collection lens 32, the aperture 92 and the detector 66 cooperate to provide for constant illumination of the detector 66 by the reflections of the laser beams from the bar code symbols over an extended depth of field. Constant illumination is provided by maintaining a constant collection angle for the light scattered (reflected) by the bar code. This constant collection angle assures that the detector signal is of constant amplitude over the entire depth of focus (depth of field) of the optical system.

FIG. 5 shows the arrangement in a simplified manner eliminating the 90° turns in the path of the reflections to the detector 66 due to the beam splitters 62 and 74. The collection lens has a diameter D and the detector aperture 92 has a diameter d. The distance from the collection lens to the detector is $S_1$. The active surface of the photodetector 66 is substantially flush with the aperture 92. Therefore the distance $S_1$ is substantially the distance to the aperture 92 as well as to the detector 66. The distance from the collection lens 32 to the maximum depth of field at point A is $S_2$. The minimum depth of field is at point B, in contact with the collection lens 32. The amount of light collected from point A will be the same as the amount of light collected from point B, if the collection angles ($\theta_A$ and $\theta_B$) are equal. This condition requires (for $\theta_A$ and $\theta_B$ small, i.e. much less than one radian)

$$\theta_A \left( \sim \frac{D}{S_2} \right) = \theta_B \left( \sim \frac{d}{S_1} \right) \tag{1}$$

or $$\frac{D}{S_2} = \frac{d}{S_1} \quad \frac{d}{D} = \frac{S_1}{S_2}. \tag{2}$$

Note that no substantial refraction of the light occurs at point B since that point is in contact with the lens 32. The parameters $S_1$ and $S_2$ are related by the thin lens equation, i.e.

$$1/f = 1/S_1 + 1/S_2, \tag{3}$$

where f is the focal length of the collection lens 32. $S_2$ is the maximum depth of focus, for example 10 inches from the beam port 28. f is the focal length of the lens as determined by the location of the optimum plane for reading high density (narrow bar width) code symbols. The relationship for d/D can be reduced to $$\frac{d}{D} = \frac{S_1}{S_2} = \frac{1}{S_2}\left[\frac{1}{f} - \frac{1}{S_2}\right] = \frac{1}{S_2}\left[\frac{S_2 - f}{fS_2}\right] \tag{4}$$

or $$\frac{d}{D} = \left[\frac{S_2}{f} - 1\right] \tag{5}$$

By way of example consider the case in which f is 50 mm and $S_2$ is 250 mm. Then $$\frac{d}{D} = \left[\frac{S_2}{f} - 1\right] = \left[\frac{250}{50} - 1\right] = [5 - 1] = 4 \tag{6}$$

In this case the distance between the aperture 92 and the collection lens 32 is $$\frac{1}{S_1} = \left[\frac{1}{f} - \frac{1}{S_2}\right] = \left[\frac{S_2 - f}{fS_2}\right] \tag{7}$$

$$= \left[\frac{250-50}{50 \times 250}\right] = \left[\frac{2}{125}\right] \qquad (8)$$

Then $S_1$ is equal to 62.5 mm.

As shown in FIG. 6 the aperture 92 does not have to be in contact with the detector 66 as in FIG. 5; the collection angles $\theta_A$ and $\theta_B$ also being equal to each other.

It will be seen that the optical arrangements shown in FIGS. 5 and 6 assure constant collection efficiency from light reflected from points A and B if: (a) the detector aperture 92 is positioned so that it does not limit the amount of light gathered from point A; (b) the aperture 92 does limit the collection of light from point B so that $\theta_A$ is equal to $\theta_B$; and (c) the detector 66 has a collection area (its photosensitive area) large enough to collect all of the light that passes through the aperture 92 from point B.

From the foregoing description it will be apparent that there has been provided an improved optical device for scanning symbols and particularly bar code symbols. Variations and modifications in the herein described device, within the scope of the invention, will undoubtedly suggest themselves to those skilled in the art. Accordingly, the foregoing description should be taken as illustrative and not in a limiting sense.

We claim:

1. An optical device for detecting coded symbols having relatively more and less reflective regions which comprises means for illuminating said code symbols with a first light beam which is substantially invisible, means for simultaneously illuminating said symbols with a marker beam of light which is visible and which is coincident with said first beam to enable said first beam to be located with respect to said symbols, and means responsive to reflections of said first beam from said symbols for translating said symbols into corresponding electrical signals.

2. The optical device according to claim 1 further comprising a housing containing both said illuminating means and translating means.

3. The optical device according to claim 2 wherein said housing is of a size sufficiently small to be hand-held and movable to scan said first beam and marker beam across said code symbols.

4. The optical device according to claim 1 wherein said means for illuminating said symbols with said first beam comprises a source of coherent light and optic means for producing said first beam, said means for illuminating said symbols with said marker beam includes a source of incoherent light and optic means for directing said marker beam in coaxial relationship with said first beam toward said symbols, and said translating means includes photodetector means and optic means for directing light from said first beam reflected from said symbols along the path of said first beam to said photodetector.

5. The optical device according to claim 4 wherein said source of coherent light includes a laser diode.

6. The optical device according to claim 5 wherein said laser diode contains a laser material emitting light in the infra-red range (typically 815 nm).

7. The optical device according to claim 4 wherein said optic means in said translating means comprises spectrally selective means for passing said first beam light to said photodetector while rejecting the marker beam.

8. The optical device according to claim 7 further comprising polarization sensitive means for passing said reflected first beam of light of polarization opposite to said first beam light from said source thereof to said photodetector.

9. The optical device according to claim 4 further comprising a housing of size sufficiently small to be hand-held and wherein said means for illuminating said symbols with said first beam, said means for illuminating said symbols with said marker beam, and said translating means are all contained in said housing, said housing having a beam outlet port for said coaxial first and marker beams.

10. The optical device according to claim 9 further comprising a collection lens in said housing and adjacent to said beam port for focusing said beams within a given depth of focus in front of said beam port upon said symbols and for focusing said reflected light upon said photodetector.

11. The optical device according to claim 10 further comprising means defining an aperture in a given location between said collection lens and said detector, said aperture having such size and said location being such as to define a constant illumination of said detector for reflected light over said depth of field.

12. The optical device according to claim 10 wherein deflected light from a minimum point of said depth of focus in front of said lens passing through said aperture onto said detector is confined by said aperture to form a collection angle $\theta_B$ and light from a maximum point of said depth of focus which is focused by said lens on said detector diverges from said maximum point to the diameter of said lens to form a collection angle $\theta_A$, said location and diameter of said aperture being such that $\theta_A$ is equal to $\theta_B$.

13. The optical device according to claim 12 wherein f is the focal length of said lens, D is the diameter of said lens, d is the diameter of said aperture and S is the distance between said lens and said maximum point, the diameter of said aperture being determined by the following equation where said aperture is adjacent to said detector $$d/D = [S/f - 1].$$

14. The optical device according to claim 9 wherein said coherent light source is a laser diode, said optic means which comprises said means for illuminating said symbols with said first beam comprises collimating optic means for collimating the light from said diode into a beam, and telescope optic means for reducing the size of the beam from said collimating means, said collimating and telescope optic means and collection lens being disposed along the same first axis, wherein said incoherent light source is a lamp, said optic means which comprises said means for illuminating said symbols with said marker beam comprises a lens and first reflecting means disposed along a second axis spaced from said first axis, and second reflecting means opposite to said first reflecting means and disposed on said second axis for bringing said marker beam into coaxial relationship with said first beam.

15. The optical device according to claim 14 wherein said detector is spaced from said first axis and said optic means which comprises said translating means comprises beam splitter means between said telescope optic means and said collection lens for reflecting said reflected light to said detector.

16. The optical device according to claim 15 wherein said beam splitter means is a spectral beam splitter which passes only said first beam to said detector.

17. The optical device according to claim 14 wherein said first reflecting means is a spectral beam splitter for reflecting said marker beam and passing the said first beam therethrough, said second reflecting means is another beam splitter, said detector and said other beam splitter being disposed on opposite sides of said spectral beam splitter whereby said reflections of said first beam from said symbols passes through said spectral beam splitter to said detector and said marker beam is reflected from said spectral beam splitter to said other beam splitter which reflects said marker beam into coaxial relationship with said first beam.

18. The optical device according to claim 17 wherein said other beam splitter is a polarizing beam splitter which passes light of one polarization from said laser therethrough and reflects said scattered light reflections of said first beam which are a polarization opposite from said one polarization to said detector.

19. The optical device according to claim 15 wherein said beam splitter means is a polarizing beam splitter which passes light of one polarization from said laser diode therethrough and reflects said scattered light reflections of said first beam which are a polarization opposite from said one polarization to said detector.

20. In a bar code scanner having means for producing a beam of light which scans said code and a photodetector for translating light reflected from said code into electrical signals, the improvement comprising a collection lens for focusing said beam within a given depth of focus in front of said lens upon said code and for focusing said reflected scattered light upon said detector, means defining an aperture in a given location between said collection lens and said detector, said aperture having such size and said location being such as to define a constant illumination of said detector for the reflected scattered light over said depth of field.

21. The invention as set forth in claim 20 wherein the reflected light from a minimum point of said depth of focus in front of said lens passing through said aperture onto said detector is confined by said aperture to form a collection angle $\theta_B$ and light from a maximum point of said depth of focus which is focused by said lens on said detector diverges from said maximum point to the diameter of said lens to form a collection angle $\theta_A$, said location and diameter of said aperture being such that $\theta_A$ is equal to $\theta_B$.

22. The invention as set forth in claim 21 wherein f is the focal length of said lens, D is the diameter of said lens, d is the diameter of said aperture and S is the distance between said lens and said maximum point, the diameter of said aperture being determined by the following equation where said aperture is adjacent to said detector.

$$d/D = [S/f - 1].$$

23. In an optical device for detecting coded symbols in response to light reflected from said symbols, said device having means for illuminating said symbols with light which is substantially of one polarization, and detector means responsive to said reflected light from said symbols for translating said symbols into corresponding electrical signals, the improvement comprising polarization sensitive means for passing said reflected light from said symbols of polarization opposite to said one polarization to said detector means.

24. The improvement according to claim 23 wherein said polarization sensitive means is a spectral beam splitter which passes the light illuminating said symbols and reflects the light of opposite polarization to said detector means.

25. The improvement according to claim 24 wherein said beam splitter is a polarizing beam splitter which passes said light of one polarization there through and reflects the scattered light reflections from said symbols which are of a polarization opposite from said one polarization to said detector means.

* * * * *